US00RE35878E

United States Patent [19]

Kimura et al.

[11] E Patent Number: Re. 35,878

[45] Reissued Date of Patent: Aug. 25, 1998

[54] VARIABLE CAPACITY SWASH PLATE TYPE REFRIGERANT COMPRESSOR HAVING A DOUBLE FULCRUM HINGE MECHANISM

[75] Inventors: Kazuya Kimura; Hiroaki Kayukawa, both of Kariya, Japan

[73] Assignee: Kabushiki Kaisha Toyoda Jidoshokki Seisakusho, Kariya, Japan

[21] Appl. No.: 693,483

[22] PCT Filed: Mar. 27, 1992

[86] PCT No.: PCT/JP92/00384

§ 371 Date: Nov. 23, 1992

§ 102(e) Date: Nov. 23, 1992

[87] PCT Pub. No.: WO92/17705

PCT Pub. Date: Oct. 15, 1992

Related U.S. Patent Documents

Reissue of:

[64] Patent No.: 5,336,056
Issued: Aug. 9, 1994
Appl. No.: 952,836
Filed: Mar. 27, 1992

[30] Foreign Application Priority Data

Mar. 30, 1991 [JP] Japan ..... 3-037365

[51] Int. Cl.[6] ..... F04B 1/12

[52] U.S. Cl. ..... 417/222.1; 417/269; 74/60; 91/499

[58] Field of Search ..... 417/222.1, 222.2, 417/269, 270; 91/499, 504, 505; 74/60

[56] References Cited

U.S. PATENT DOCUMENTS

| | | | |
|---|---|---|---|
| 4,073,603 | 2/1978 | Abendschein et al. | 417/270 |
| 4,178,135 | 12/1979 | Roberts | 417/222.2 |
| 4,221,545 | 9/1980 | Terauchi | 74/60 |
| 4,553,905 | 11/1985 | Swain et al. | 417/222.2 |
| 4,581,980 | 4/1986 | Berthold | 92/12.2 |
| 4,674,957 | 6/1987 | Ohta et al. | 417/222.2 |
| 4,732,545 | 3/1988 | Ohta et al. | 417/222.2 |
| 4,815,358 | 3/1989 | Smith | 417/222.2 |
| 4,884,952 | 12/1989 | Kanamaru et al. | 417/222.2 |
| 5,055,004 | 10/1991 | Ebbing | 417/222.2 |
| 5,095,807 | 3/1992 | Wagenseil | 92/12.2 |
| 5,105,728 | 4/1992 | Hayase et al. | 417/222.2 |
| 5,174,728 | 12/1992 | Kimura et al. | 417/222.2 |
| 5,181,453 | 1/1993 | Kayukawa et al. | 92/12.2 |
| 5,184,536 | 2/1993 | Arai | 92/12.2 |

FOREIGN PATENT DOCUMENTS

| | | |
|---|---|---|
| 0190013 | 8/1986 | European Pat. Off. . |
| 0219298 | 4/1987 | European Pat. Off. . |
| 2300262 | 9/1976 | France . |
| 2415206 | 10/1974 | Germany . |
| 2759764 | 8/1977 | Germany . |
| 3545200 | 7/1986 | Germany . |
| 3638000 | 5/1987 | Germany . |
| 3924347 | 2/1990 | Germany . |
| 60-175783 | 9/1985 | Japan . |
| 62-183082 | 11/1987 | Japan . |
| 1327192 | 8/1973 | United Kingdom . |
| 2011005 | 7/1979 | United Kingdom . |

*Primary Examiner*—Charles G. Freay
*Assistant Examiner*—Peter G. Korytnyk
*Attorney, Agent, or Firm*—Brooks Haidt Haffner and Delahunty

[57] ABSTRACT

A variable capacity single headed piston swash plate type refrigerant compressor is provided with a double fulcrum hinge mechanism having a pair of hinges for providing a pivotal connection between a rotary support element of a drive shaft and a swash plate assembly, causing reciprocation of a plurality of single headed pistons in cylinder bores for compressing a refrigerant gas. The pair of hinges of the double fulcrum hinge mechanism cooperate to absorb reaction forces of the compression and suction of the refrigerant gas acting from the pistons on the swash plate assembly to thereby prevent application of a local load to a sleeve element on which the swash plate assembly is turnably mounted.

7 Claims, 4 Drawing Sheets

VARIABLE CAPACITY SWASH PLATE TYPE REFRIGERANT COMPRESSOR HAVING A DOUBLE FULCRUM HINGE MECHANISM

Matter enclosed in heavy brackets [ ] appears in the original patent but forms no part of this reissue specification; matter printed in italics indicates the additions made by reissue.

TECHNICAL FIELD

The present invention relates to a variable capacity swash plate type refrigerant compressor mainly used for an airconditioner for a car. More particularly, it relates to a variable capacity single headed piston swash plate type compressor provided with a double fulcrum hinge mechanism able to pivotally support a variable inclination swash plate assembly while preventing an application of an excessive load to a sleeve element on which the variable inclination swash plate assembly is turnably mounted.

BACKGROUND ART

Japanese Unexamined (Kokai) Utility Model Publication No. 62-183082, published on Nov. 20, 1987 by the Japanese Patent Office, discloses a variable capacity swash plate type compressor having single headed pistons therein. The variable capacity swash plate type compressor of Japanese Unexamined Utility Model Publication '082 includes a cylinder block having a crank chamber formed therein for housing an inclination changeable wobble plate assembly, and a plurality of cylinder bores in which a plurality of single headed pistons are reciprocally fitted, to suck and compress a refrigerant gas and to discharge the compressed refrigerant gas. The wobble plate assembly includes a rotary drive element rotatable with the drive shaft and a swash plate non-rotatably supported on the rotary drive element, and is driven by a rotatably supported axial drive shaft to which a lug member is fixedly attached to be projected radially and rotated together with the drive shaft within the crank chamber. The lug member is operatively connected to the rotary drive element of the wobble plate assembly via a hinge mechanism, and a sleeve element slidably mounted on the drive shaft is also operatively connected to the rotary drive element of the wobble plate assembly. Namely, the rotary drive element is able to be rotated together with the drive shaft and to change an angle of inclination thereof from an erect position corresponding to a small compression capacity position to a fully inclined position corresponding to a large compression capacity position. The hinge mechanism includes an elongated guide hole bored through the lug member, and a hinge pin having one end movably fitted in the elongated guide hole of the lug member and the other end fixed to a swing plate member extended from the rotary drive plate. The sleeve element is arranged to be axially slid, and provided with a lateral pin radially projected therefrom to form trunnion pins about which the rotary drive plate is pivotally mounted. The swash plate of the wobble plate assembly is operatively connected to the plurality of pistons via respective piston rods having ball-and-socket joints on both ends, and thus, when the drive shaft is rotated, the rotation of the drive shaft and the rotary drive element is converted into a reciprocation of the respective pistons in the cylinder bores. The cylinder block has a communication passageway formed therein and extended between the crank chamber and a suction chamber, for receiving therein the refrigerant gas before compression and an extent of the communication between the abovementioned two chambers is controlled by a capacity control valve.

With the above-mentioned compressor, when the respective pistons are reciprocated in response to the rotation of the drive shaft, the refrigerant gas before compression is pumped from the suction chamber into the cylinder bores, to be compressed by the pistons during the suction and compression strokes of the pistons, and the compressed gas is discharged from the cylinder bores toward a discharge chamber for the refrigerant gas after compression. During the operation of the compressor, a force consisting of first and second forces acts on the wobble plate assembly from the pistons, as a reaction of the compression and suction of the refrigerant gas by the pistons, and the wobble plate assembly is physically supported by the hinge mechanism at a fulcrum position thereof at which the hinge pin is in contact with the guide wall of the elongated guide hole of the lug member.

The construction of the above-mentioned hinge mechanism including the projected lug member radially projected from the drive shaft and the hinge pin in engagement with the elongated hole of the lug member results in an arrangement such that the fulcrum position of the hinge mechanism is moved around the axis of the drive shaft so as to constantly correspond to a given position of the swash plate at which the swash plate is connected to one of the pistons moved in the cylinder bore to the top dead center "T" thereof from the bottom dead center ["B,"] "$B_1$" thereof, as diagrammatically illustrated in FIG. 6 of the accompanying drawings, during the rotation of the rotary drive element of the wobble plate assembly. Nevertheless, when each of the pistons approaches the top dead center "T" thereof during the reciprocation thereof, the discharge of the compressed refrigerant gas from the cylinder bore toward the discharge chamber is completed, and as soon as the movement of the piston is reversed at the top dead center "T", the suction of the refrigerant gas before compression is subsequently carried out for a time between "T" and "$B_2$" of FIG. 6. Therefore, when each piston is moved between the bottom dead position "$B_1$" and the top dead center "T", the piston applies the first force to the swash plate, as a reaction of the compression of the refrigerant gas, and when the piston is moved between the top dead center "T" and the bottom dead center "$B_2$", the piston applies the second force to the swash plate, as a reaction of the suction of the refrigerant gas. Accordingly, the total force of the first and second forces acting from each piston on the wobble plate assembly is concentrated at a position of the assembly sifted from the fulcrum position "P" of the hinge mechanism in a direction of the rotation of the rotary drive plate of the wobble plate assembly, and an amount of the shift depends on the number of rotations of the drive shaft, and the compression ratio of the refrigerant gas or the angle of inclination of the wobble plate assembly. Therefore, the wobble plate assembly supported by the fulcrum position of the hinge mechanism must be subjected to a bending moment due to the shifting of the position at which the total force of the first and second reaction forces acts on the wobble plate assembly from the fulcrum position of the hinge mechanism. This bending moment acting on the wobble plate assembly is absorbed by the sleeve element to thereby apply an excessive local force to the sleeve element, and as a result, an abnormal noise is generated when the sleeve is slid on the drive shaft and the physical durability of the sleeve element is reduced.

DISCLOSURE OF THE INVENTION

Therefore, an object of the present invention is to obviate the problems encountered by the abovementioned variable [capacity-single] *capacity single* headed piston swash plate type refrigerant compressor according to the prior art.

Another object of the present invention is to provide a variable capacity single headed piston swash plate type compressor provided with a novel double fulcrum type hinge mechanism for pivotally supporting a variable inclination rotary swash plate assembly in a manner such that a load applied to a slidable sleeve element on which the swash plate is turnably mounted is reduced when a force consisting of reaction forces of compression and suction of a refrigerant gas is imposed on the swash plate by pistons reciprocating in cylinder bores.

In accordance with the present invention, there is provided a variable capacity single headed piston swash plate type compressor including:

an axially extended cylinder block having front and rear ends thereof and a plurality of axial cylinder bores formed therein;

a front housing sealingly connected to the front end of the cylinder block and defining a closed crank chamber therein extending in front of ends of the cylinder bores;

a rear housing connected to the rear end of the cylinder block and defining therein a suction chamber for a refrigerant gas before compression and a discharge chamber for the refrigerant gas after compression;

a drive shaft rotatably held by the cylinder block and the front housing and having an axis thereof axially extended through the crank chamber;

a rotary support element mounted on the drive shaft to be rotated therewith in the crank chamber;

a variable inclination rotary swash plate assembly pivotally held by a hinge means and slidably mounted around the drive shaft via a slidable sleeve element and capable of turning about an axis perpendicular to the axis of the drive shaft to thereby vary an angle of inclination thereof;

a plurality of reciprocatory single headed pistons fitted in the cylinder bores of the cylinder block and engaged with the swash plate assembly via a motion conversion means for converting a rotation of the swash plate assembly into a reciprocation of the single headed pistons in the cylinder bores; and a control valve means for adjusting a fluid pressure in the crank chamber to thereby control a capacity of the compressor, wherein the hinge meals is provided with a pair of hinges to provide two fulcrum positions about which the swash plate assembly is pivotally hinged, the two fulcrum positions being arranged to be spaced apart from one another with respect to a center position which lies in a plane including the axis of the drive shaft and passing through a predetermined position of the swash plate assembly at which the swash plate assembly is engaged with one of the plurality of pistons brought to a top dead center thereof.

Since the two fulcrum positions of the hinge mean are symmetrically arranged on opposite sides of the plane passing through the predetermined position of the swash plate assembly at which the swash plate assembly is engaged with one of the plurality of pistons moved to a top dead center thereof, one of the two fulcrum positions appropriately absorbs a reaction force of the compression or the refrigerant gas acting from the pistons on the swash plate assembly while the other of the two fulcrum positions appropriately absorbs a reaction force of the suction of the refrigerant gas acting from the pistons on the swash plate assembly. Namely, the hinge means having the two fulcrum positions always can absorb a total force of the reaction forces of the compression and suction of the refrigerant gas, so that the swash plate assembly is not subjected to an unfavorable beading moment, and thus a local load is not applied to the sleeve element.

BRIEF DESCRIPTION OF THE DRAWINGS

The above and other objects, features and advantages of the present invention will be made more apparent from the ensuing description of the embodiments thereof with reference to the accompanying drawings wherein.

BEST MODE OF CARRYING OUT THE INVENTION

The description of a variable capacity swash plate type refrigerant compressor of a first embodiment of the present invention will be provided below with reference to FIGS. 1 through 3.

Figure 1:
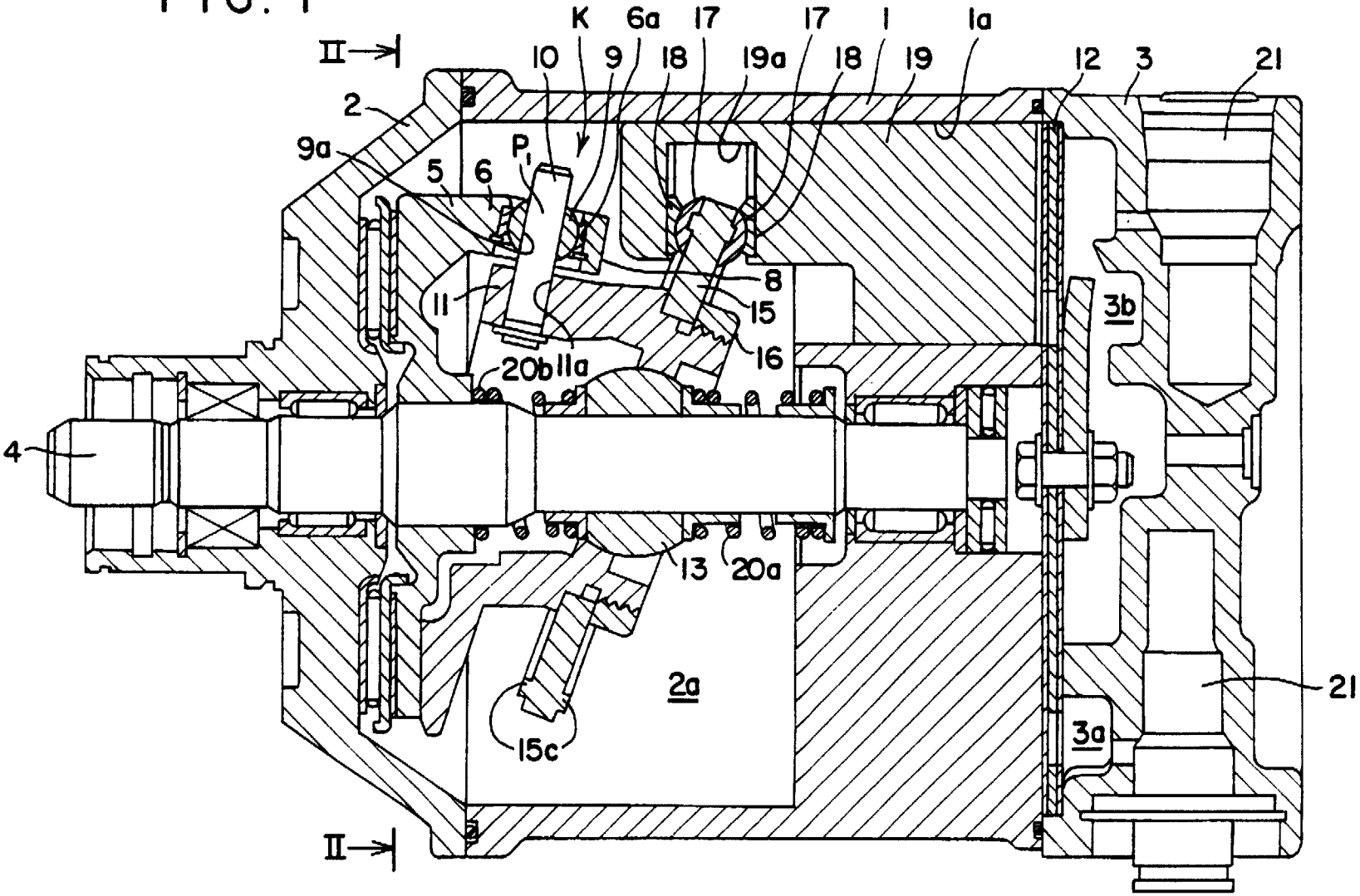
FIG. 1 is a cross-sectional view of a variable capacity single headed piston swash plate type compressor provided with a double fulcrum hinge means according to a first embodiment of the present invention.

As best illustrated in FIG. 1, the variable capacity swash plate type refrigerant compressor of the first embodiment has a cylinder block 1 having a plurality of cylinder bores 1a, and front and rear ends of the cylinder block 1 are sealingly closed by front and rear housings 2 and 3. The cylinder block 1 and the front housing 2 defines an air-tight sealed cylindrical crank chamber 2a therebetween to house a swash plate assembly including a cylindrical rotary drive element 11 and a swash plate 15 therein. A valve plate 12 is intervened between the rear end of the cylinder block 1 and the rear housing 3 having formed therein a suction chamber 3a and a discharge chamber 3b which can be communicated with the cylinder bores 1a of the cylinder block 1 via suction and discharge valve mechanisms, respectively. An axial drive shaft 4 is centrally arranged to extend through the front housing 2 and the cylinder block 1, and rotatably supported by bearings mounted in the front housing 2 and the cylinder block 1. A front end of the drive shaft 4 is outwardly extended from the front housing 2 to be connectable to a drive source such as a car engine, and a rear end of the drive shaft 4 is rotatably supported by the bearing in the cylinder block 1.

A rotary support 5 is fixedly mounted on the drive shaft 4 in the crank chamber 2a to be rotatable with the drive shaft 4. The rotary support 5 is axially supported by a thrust bearing seated on an inner end of the front housing 2, and has rearwardly extended two support arms 6 for supporting a cylindrical rotary drive element 11 of the swash plate assembly via a hinge means having a pair of hinges designated by "K", as shown in FIG. 2.

Figure 2:
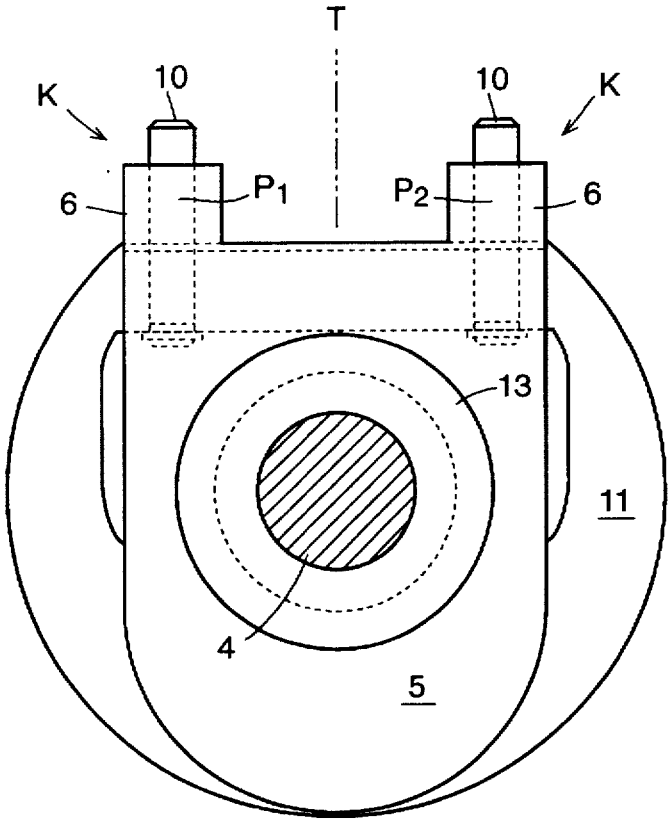
FIG. 2 is a partial cross-sectional view taken along the line II—II of FIG. 1.

As will be understood from FIG. 2, the two hinges K provide a pivotal connection between the rotary support 5 and the rotary drive element 11, and are arranged in a manner such that the hinges K are equidistantly spaced from one another with respect to a center position lying in a plane which extends to include therein an axis of the drive shaft 4 and which passes through a predetermined position of the swash plate 15 at which the swash plate 15 is engaged with one of a plurality of pistons 19 brought to a top dead center "T" thereof. More specifically, the hinge means having the two hinges K is arranged between the two support arms 6 of the rotary support 5 and a front end of the cylindrical drive element 11.

Referring to both FIG. 1 and FIG. 2, both support arms 6 of the rotary support 5 are axially rearwardly extended, and arranged to be symmetrical with respect to the above-mentioned plane including therein the axis of the drive shaft 4 and passing through the predetermined position of the swash plate 15 at which the swash plate 15 is engaged with the piston brought to the top dead center T thereof. Each of the support arms 6 has a through-bore 6a in which a race member a is fixedly seated to turnably receive a ball element 9. The ball element 9 has formed therein a through-hole 9a operative as a guide bole permitting an axial slide of a guide pin 10 therein. The guide pins 10 of the two support arms 6 of the pair of hinges K are arranged to be in parallel with one another.

The rotary drive element 11 of the swash plate assembly has formed therein two through-bores 11a, in which the guide pins 10 are fixedly press-fitted. Namely, the two hinges K of the hinge means define a pair of hinge positions $P_1$ and $P_2$arranged symmetrically with respect to the plane passing through the predetermined position of the swash plate 15 at which the swash plate 15 is engaged with the piston 19 brought to the top dead center thereof.

Figure 3:
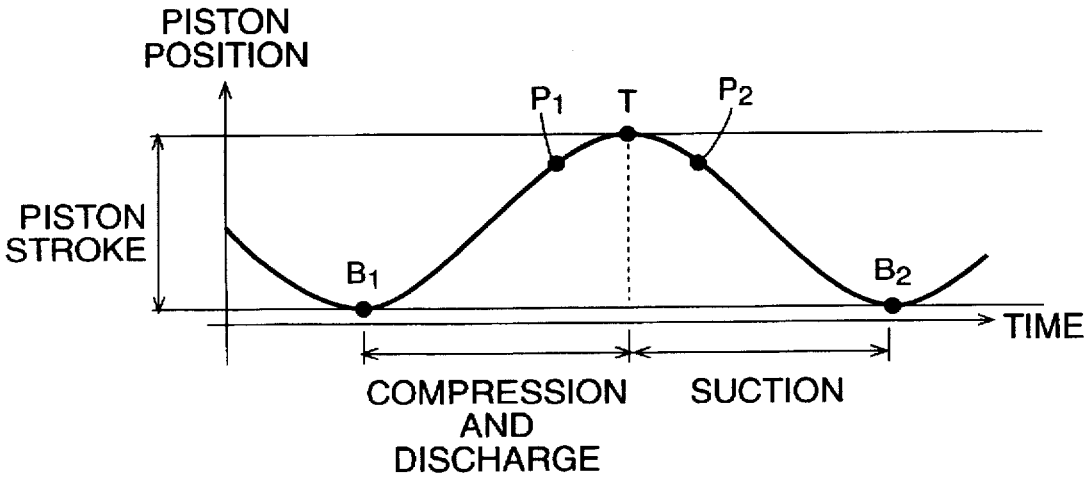
FIG. 3 is a diagrammatical view indicating a relationship between the time and position of a piston with respect to the compressor according to the present invention.

As illustrated in FIG. 3, in accordance with the above-described symmetrical arrangement of the hinge positions $P_1$ and $P_2$ of the pair of hinges K of the hinge means, the hinge position $P_1$ is arranged to present a pivotal connection between one of the support arms 6 of the rotary support 5 and portion of the rotary drive element 11 of the swash plate assembly, which portion acts to move each single headed piston 19 to an intermediate position of the entire compression stroke thereof, and the hinge position $P_2$ is arranged to present a pivotal connection between the other of the support arms 6 of the rotary support 5 and a different portion of the rotary drive element 11 of the swash plate assembly, which portion acts to move each piston 19 to an intermediate position of the entire suction stroke thereof.

The swash plate 15 mounted on the rotary drive element 11 is tightly fixed by a ring 16 threadedly engaged with a hub portion of the drive element 11. The swash plate 15 is provided with support rails 15c on both faces thereof extended annularly around the axis of the drive shaft 4, and these support rails 15c are slidably engaged with respective guide grooves of inner shoes 17 having a spherical back face, respectively, and thus the inner shoes 17 are prevented from being shifted in a radial direction or the swash plate 15. The inner shoes 17 are engaged with semicylindrical outer shoes 18 in such a manner that the spherical back faces of the inner shoes 17 are in sliding contact with cylindrical inner faces of the outer shoes 18 outer faces of which are also shapef in a cylindrical face, respectively. These cylindrical outer races of the outer shoes 18 are in sliding contact with cylindrical walls of a cutout 19a of each piston 19. The cutout 19a is recessed in a direction perpendicular to the axis of the piston 19 and provided for permitting a passage of the swash plate 15 therethrough during the rotation of the swash plate 15. Namely, the inner and outer shoes 17 and 18 are provided as a motion conversion means for converting the rotation of the inclined swash plate 15 into a reciprocation of each of the pistons 19 in the cylinder bore 1a.

The rotary drive element 11 is mounted on a sleeve 13 slidably mounted on the drive shaft 4. The sleeve element 13 is axially slidable on the drive shaft 4 under spring forces of springs 20a and 20b arranged on opposite sides of the sleeve element 13, and an outer spherical face of the sleeve element 13 is in turnable contact with a spherical inner face of the rotary drive element 11[,] . Thus, the swash plate 15 of the swash plate assembly can be rotated with the drive shaft 4 via the rotary support 5 and the rotary drive element 11, and turned to change an angle of inclination thereof via the two hinges K of the hinge means and the sleeve element 13.

Control valves 21 are provided in the rear housing 3 for adjusting a fluid pressure level within the crank chamber 2a as shown in FIG. 1.

When the drive shaft 4 is rotated, the swash plate 15 of the swash plate assembly having an angle of inclination is rotated also, and thus the rotation of the inclined swash plate 15 is converted into a reciprocation of the pistons 19 in the cylinder bores 1a via the motion conversion means having the abovementioned inner and outer shoes 17 and 18. Therefore, a refrigerant gas is pumped from the suction chamber 3a of the rear housing 3 into the respective cylinder bores 1a in which the refrigerant gas is compressed by the reciprocating pistons 19. The compressed refrigerant gas is discharged from the cylinder bores 1a toward the discharge chamber 3b of the rear housing 3. The capacity of the compressed refrigerant gas discharged toward the discharge chamber 3b is controlled by adjusting the fluid pressure level within the crank chamber 2a by the control valves 21. Namely when the fluid pressure level within the crank chamber 2a is lowered by the operation of the control valves 21 with respect to a suction pressure level, a back pressure acting on the respective pistons 19 is reduced, and accordingly, the angle of inclination of the swash plate 15 is increased. Namely, in the respective hinges K of the hinge means, the ball elements 9 of the respective hinges K are turned in the race members 8 while permitting the respective guide pins 10 to slide with respect to the ball elements 9, i.e., the guide pins 10 axially slide through the through-holes 9a of the ball elements 9. Therefore, the rotary drive element 11 of the swash plate assembly is turned about the sleeve 13 sliding axially in the forward direction against the spring force of the lefthand spring 20b. Accordingly, the angle of inclination of the swash plate 15 with respect to a plane perpendicular to the axis of the drive shaft 4 is increased, and thus the inner shoes 17 of the motion conversion means are slidingly turned in the outer shoes 18 which slide radially with respect to the axis of the respective piston 19. As a result, the stroke of the respective pistons 19 is extended to thereby increase the compression capacity of the compressor. When the swash plate 15 reaches the largest inclination position, the largest capacity operation of the compressor is performed.

On the contrary, when the control valves 21 closes a fluid connection between the crank chamber 2a and the suction chamber 3a, to thereby prevent an extraction of the fluid pressure from the crank chamber 2a, the fluid pressure level within the crank chamber 2a is raised by a blow-by gas leaking from the cylinder bores 1a into the crank chamber 2a, and thus a back pressure acting on the respective pistons 19 becomes large enough to decrease an angle of inclination of the swash plate 15. Namely, in the respective hinges K of the hinge means, the ball elements 9 are slidingly turned in the race members 8 to thereby turn the rotary drive element 11 about the sleeve element 13 in a counterclockwise direction in FIG. 1 via the parallel-arranged guide pins 10. Also, the sleeve element 13 is slid in the rearward direction against the spring force of the righthand spring 20a. Therefore, the guide pins 10 are slidingly moved out of the ball elements 9 to thereby permit the swash plate 15 to turn toward a small inclination angle position thereof, and thus the turning of the inner shoes 17 and the sliding of the outer shoes 18 of the motion conversion means occur to thereby shorten the reciprocating stroke of the respective pistons 19. Accordingly, the compression capacity of the compressor is decreased. When the swash plate 15 reaches the smallest inclination angle position thereof, i.e., an erect position thereof, the smallest capacity operation of the compressor is performed.

During the above-mentioned compressing operation of the compressor, one of the hinges K of the hinge means having the hinge position $P_1$ contributes to the absorbing of the entire reaction forces acting from the respective pistons 19 in the compression stroke thereof on the swash plate 15 via the motion conversion means in response to the compression of the refrigerant gas by these pistons 19 in the compression stroke thereof, and the other hinge K of the hinge means having the hinge position $P_2$ contributes to the absorbing of the entire reaction forces acting from the respective pistons 19 in the suction stroke thereof on the swash plate 15 via the motion conversion means in response to the suction of the refrigerant gas by these pistons 19 in the suction stroke thereof. Further, since the two hinges K of the hinge means can create to provide a constant contribution to the absorbing of the reaction forces of the compression and suction of the refrigerant gas during a complete rotation of the swash plate assembly, the swash plate 15 of the swash plate assembly is not subjected to an unfavorable bending moment, and thus the sleeve element 13 on which the assembly is turnably mounted does not suffer from an application of a local load by the swash plate assembly. Namely, the sleeve element 13 is able to permit a smooth turn of the swash plate assembly, which is constantly maintained in a spherical contact with the outer spherical face of the sleeve element 13.

With the described construction of the compressor of FIGS. 1 through 3, the cooperation of the double fulcrum hinge means having the pair of hinges K arranged to be equidistantly spaced from the plane including the axis of the drive shaft and passing the predetermined position of the swash plate 15 at which the swash plate 15 is engaged with one of the single headed pistons 19 brought to the top dead center "T" thereof, and the sleeve element 13 having the spherical outer face in a spherical contact with the swash plate assembly enables an elimination of the conventional sleeve pins arranged between the conventional sleeve element and the wobble plate assembly to absorb a bending moment acting on the wobble plate assembly. Thus, the sleeve element 13 employed for the compressor of the present invention can avoid a local abrasion thereof, and exhibit a long operation life without causing noise during the operation of the compressor.

Figure 4:
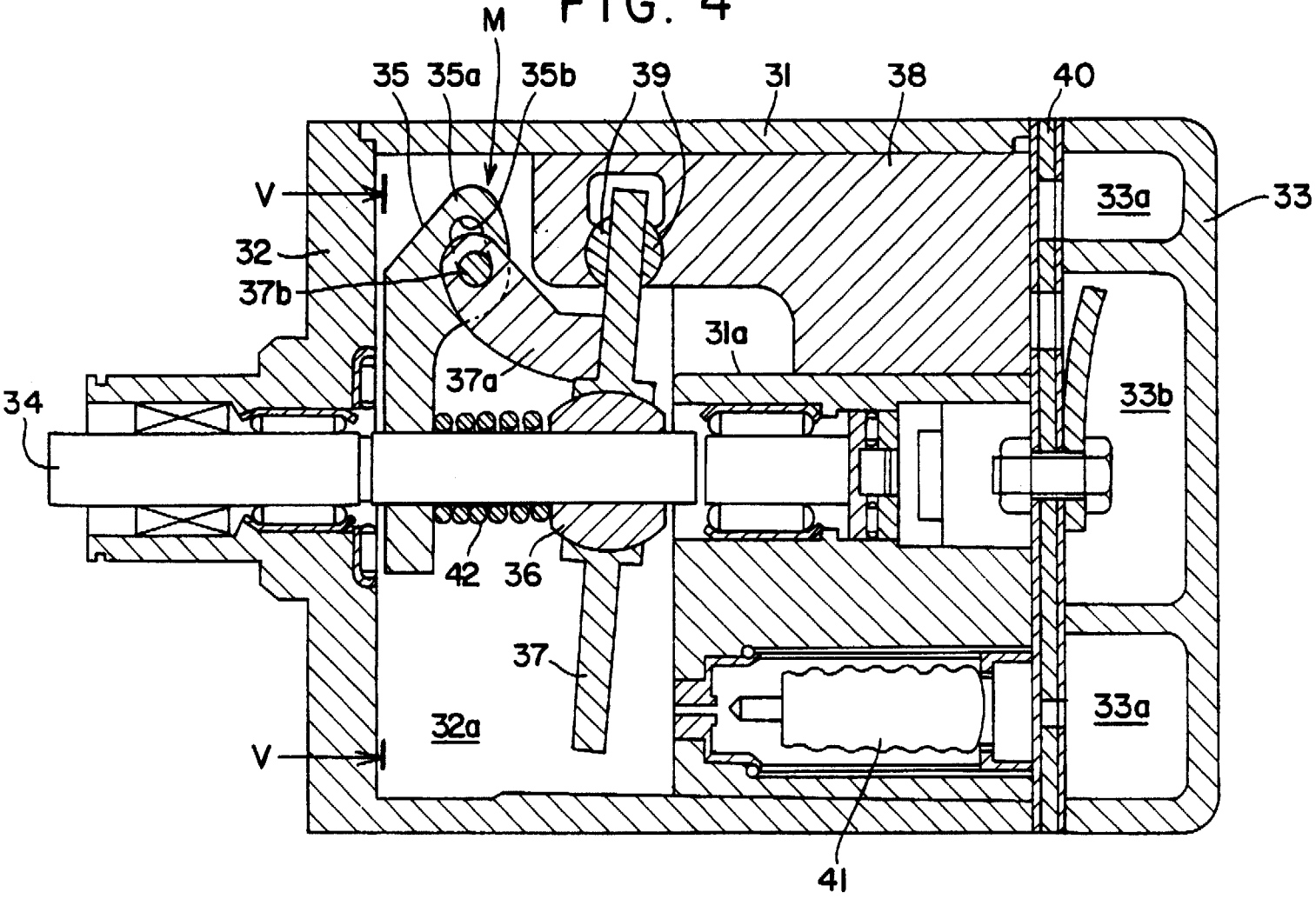
FIG. 4 is a cross-sectional view of a variable capacity single headed piston swash plate type compressor provided with a double fulcrum hinge means according to a second embodiment of the present invention.

Referring to FIG. 4 illustrating a variable capacity single headed piston swash plate compressor according to a second embodiment of the present invention, a cylinder block 31 having a plurality of cylinder bores 31a, and front and rear ends of the cylinder block 31 are sealingly closed by front and rear housings 32 and 33. The cylinder block 31 and the front housing 32 defines an air-tight sealed cylindrical crank chamber 32a therebetween to house a swash plate assembly including a swash plate 37 therein. A valve plate 40 is intervened between the rear end of the cylinder block 31 and the rear housing 33 having formed therein a suction chamber 33a and a discharge chamber 33b which can be communicated with the cylinder bores 31a of the cylinder block 31 via suction and discharge valve mechanisms, respectively. An axial drive shaft 34 is centrally arranged to extend through the front housing 32 and the cylinder block 31, and rotatably support by bearings mounted in the front housing 32 and the cylinder block 31. A front end of the drive shaft 34 is outwardly extended from the front housing 32 to be connectable to a drive source such as a car engine, and a rear end of the drive shaft 34 is rotatably supported by the bearing in the cylinder block 31.

A rotary support 35 is fixedly mounted on the drive shaft 4 in the crank chamber 32a to be rotatable with the drive shaft 34. The rotary support 35 is axially supported by a thrust bearing seated on an inner end of the front housing 32, and has two rearwardly extended support arms 35a for pivotally supporting the swash plate assembly via a hinge means having a pair of hinges designed by "M", as shown in FIG. 5.

Figure 5:
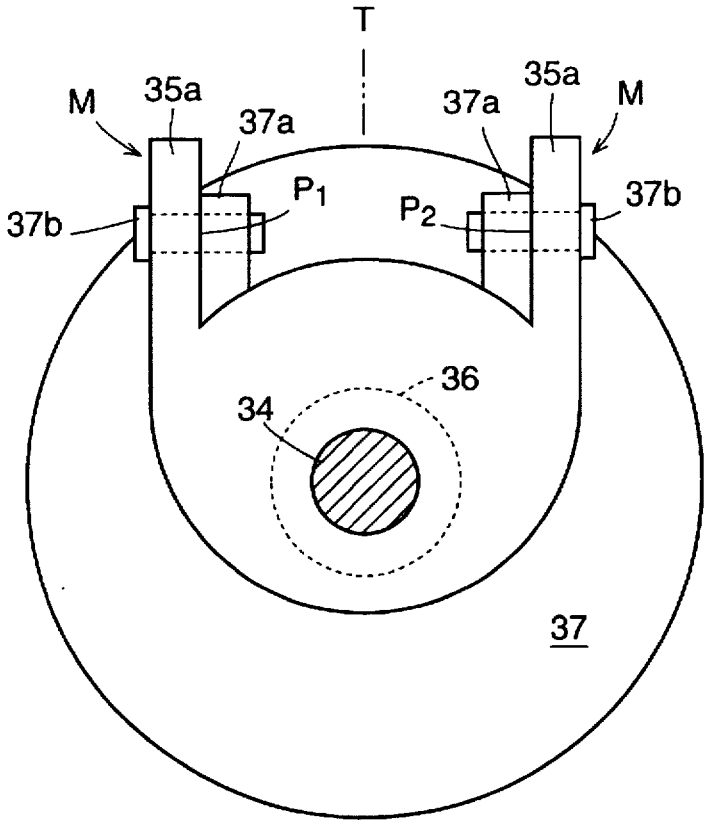
FIG. 5 is a partial cross-sectional view taken along the line V—V of FIG. 4.

As will be understood from FIGS. 4 and 5, the two hinges M provide a pivotal connection between the two support arms 35a of the rotary support 35 and a pair of swing plates 37a fixed to the swash plate assembly, and are arranged in a manner such that the hinges M are equidistantly spaced from one another with respect to a center position lying in a plane which extends to include therein an axis of the drive shaft 34 and pass through a predetermined position of the swash plate 37 at which the swash plate 37 is engaged with one of a plurality of pistons 38 brought to a top dead center "T" thereof. More specifically, the hinge means having the pair of hinges M is arranged between the two support arms 35a of the rotary support 35 and front ends of the pair of swing plates 37a.

Figure 6:
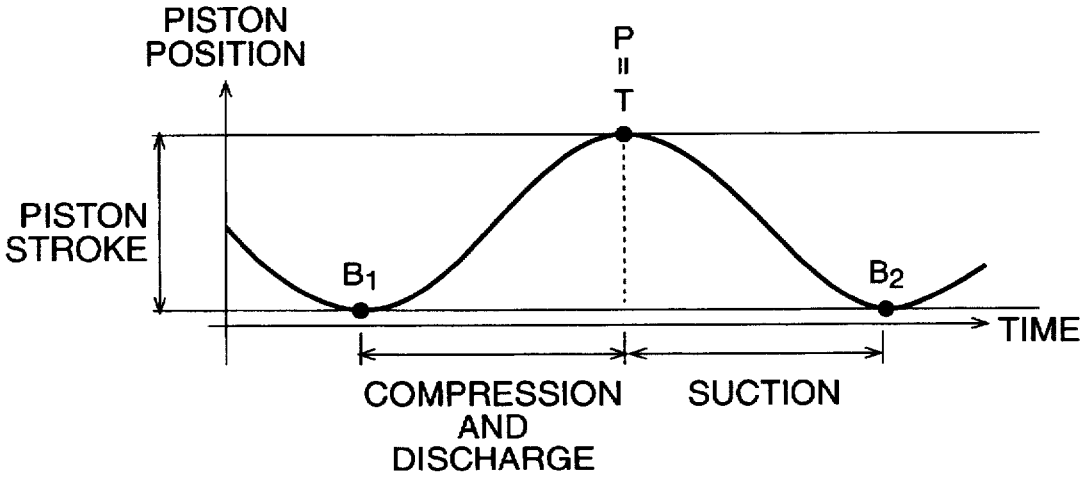
FIG. 6 PRIOR ART
FIG. 6 is a diagrammatical view indicating a relationship between the time and position of a piston with respect to the compressor according to the prior art.

Both support arms 35a of the rotary support 35 are axially rearwardly extended, and arranged to be symmetrical with respect to the above-mentioned plane including therein the axis of the drive shaft 34 and passing through the predetermined position of the swash plate 37 at which the swash plate 15 is engaged with the piston 38 brought to the top dead center "T" thereof. The support arms 35a have an elongated through-bore 35b[.], respectively, in which an end of each of a pair of hinge pins 37b is engaged. The other end of each of the hinge pins 37b is fixed to the associated one of the pair of swing arms 37a of the swash plate 37. The hinge pins 37b of the hinges "M" of the present embodiment are arranged to be coaxial with each other in a direction vertical to the axis of the drive shaft 34 as clearly illustrated in FIG. 6. Thus, fulcrum positions $P_1$ and $P_2$ of the pair of hinges M are arranged to be symmetrical with respect to a plane extending to include therein an axis of the drive shaft 34 and passing through a predetermined position of the swash plate 37 at which the swash plate 37 is engaged with one of a plurality of pistons 38 brought to the top dead center "T" thereof. Namely, the fulcrum positions $P_1$ and $P_2$ of the pair of hinges "M" can act in the same manner as those of the pair of hinges "K" of the first embodiment of FIGS. 1 and 2. Namely, as shown in FIG. 3, in accordance with the above-described symmetrical arrangement of the hinge positions $P_1$ and $P_2$ of the pair of hinges M of the hinge means, the hinge position $P_1$ provides a pivotal connection between one of the support arms 35a of the rotary support 35 and one of the swing arms 37a of the swash plate 37, acting to move each single headed piston 38 to an intermediate position of the entire compression stroke thereof, and the hinge position $P_2$ provides a pivotal connection between the other of the support arms 35a of the rotary support 35 and the other of the swing arms 37a of the swash plate 37, acting to move each piston 19 to an intermediate position of the entire suction stroke thereof.

The swash plate 37 has flat faces on opposite sides thereof, and is mounted around the drive shaft 34 via a sleeve element 36 slidably mounted on the drive shaft 34. The sleeve element 36 has formed therein a spherical outer face in spherical contact with a central hub portion of the swash plate 37. Therefore, the swash plate 37 can be rotated together with the drive shaft 34 and turned about the sleeve element 36 to change an angle of inclination thereof with respect to a plane perpendicular to the axis of the drive shaft 34.

The swash plate 37 is operatively engaged with the plurality of single beaded pistons 38 reciprocatorily fitted in the cylinder bores 31a of the cylinder block 31 via respective pair of shoes 39. Each shoe 39 has a flat face in contact with one of the flat faces of the swash plate 37, and a spherical face in turnable contact with a spherical recess provided in a radial cutout of each piston 38. The radial cutout of each piston 38 is arranged in an end of the piston opposite to a compressing end face of the piston 38.

The compressor of FIG. 4 is provided with a control valve 41 arranged in the cylinder block 31 for controlling fluid communication between the crank chamber 32a and the suction chamber 33a to thereby adjust fluid pressure level in the crank chamber 32a.

When the drive shaft 34 is rotated, the swash plate 37 of the swash plate assembly having an angle of inclination is rotated together therewith, and thus the rotation of the inclined swash plate 37 is converted into a reciprocation of the pistons 38 in the cylinder bores 31a via the motion conversion means having the above-mentioned pair of spherical shoes 39. Therefore, a refrigerant gas is pumped from the suction chamber 33a of the rear housing 33 into the respective cylinder bores 31a in which the refrigerant gas is compressed by the reciprocating pistons 38. The compressed refrigerant gas is discharged from the cylinder bores 31a toward the discharge chamber 33b of the rear housing 33. The capacity of the compressed refrigerant gas discharged toward the discharge chamber 33b is controlled by adjusting the fluid pressure level within the crank chamber 32a by the control valve *41*.

During the above-mentioned compressing operation of the compressor, one of the hinges M or the hinge means having the hinge position $P_1$ contributes to the absorbing of the entire reaction forces acting from the respective pistons 38 in the compression stroke thereof on the swash plate 31 via the motion conversion means in response to the compression of the refrigerant gas by these pistons 38 in the compression stroke thereof, and the other hinge M of the hinge means having the hinge position $P_2$ contributes to the absorbing of the entire reaction forces acting from the respective pistons 38 in the suction stroke thereof on the swash plate 37 via the motion conversion means in response to the suction of the refrigerant gas by these pistons 38 in the suction stroke thereof. Further, since the two hinges M of the hinge means can cooperate to provide a constant contribution to the absorbing of the reaction forces of the compression and suction of the refrigerant gas during a complete rotation of the swash plate assembly, the swash plate 37 of the swash plate assembly is not subjected to an favorable bending moment, and thus the sleeve element 36 on which the assembly is turnably mounted does not suffer from an application of a local load by the swash plate assembly. Namely, the sleeve element 36 is able to permit a smooth turn of the swash plate 37 constantly maintained in a spherical contact with the outer spherical face of the sleeve element 36. Thus, a local abrasion of the sleeve element 36 does not occur, and accordingly, noise is not generated during the compressing operation of the compressor. Also, a long operation life of the sleeve element 36 and the swash plate 37 is obtained.

Although the foregoing description is provided in connection with the two preferred embodiments of the present invention, many variations and modifications will occur to persons skilled in the art without departing from the scope of the present invention. For example, the pair of fulcrum positions $P_1$ and $P_2$ of the hinges "K" or "M" may be arranged to be asymmetrical with respect to a plane extending to include the axis of the drive shaft and passing through a predetermined position of the swash plate 15 or 37 at which the swash plate is engaged with one of the single headed pistons 19 or 38 brought to a top dead center thereof as required.

Further, the described double fulcrum hinge means is incorporated in a variable capacity swash plate type refrigerant compressor having a swash plate rotated together with the drive shaft, but the double fulcrum hinge means may also be incorporated in a variable capacity swash plate type refrigerant compressor having a swash plate assembly including a non-rotatable wobble plate for driving the reciprocation of the single headed pistons.

From the foregoing description it will be understood that, according to the present invention, since a double fulcrum hinge means for providing a pivotal support between a rotary support of a drive shaft and a variable inclination swash plate assembly has a pair of fulcrum positions, the hinge means is able to absorb the reaction forces of the compression and suction of a refrigerant gas without applying a local load to a sleeve element on which the swash plate assembly is turnably mounted. Therefore, the sleeve element does not suffer from a local abrasion, and can smoothly and turnably support the swash plate *assembly* increasing the operational life of the compressor.

I claim:

1. A variable capacity single headed piston swash plate type compressor comprising:

an axially extended cylinder block having front and rear ends thereof and a plurality of axial cylinder bores formed therein;

a front housing sealingly connected to the front end of said cylinder block and defining a closed crank chamber therein extending in front of ends of the cylinder bores;

a rear housing connected to the rear end of said cylinder block and defining therein a suction chamber for a refrigerant gas before compression and a discharge chamber for the refrigerant gas after compression;

a drive shaft rotatably held by said cylinder block and said front housing with a longitudinal axis thereof extending through said crank chamber;

a rotary support element mounted on said drive shaft to be rotated therewith in said crank chamber;

a variable inclination rotary swash plate assembly pivotally held by a hinge means and slidably mounted on said drive shaft [via a slidable sleeve element] for rotation about an axis perpendicular to the axis of said drive shaft to thereby vary an angle of inclination thereof;

a plurality of reciprocatory single headed pistons fitted in said cylinder bores or said cylinder block and engaged with said swash plate assembly via a motion conversion means for converting rotation of said swash plate assembly into reciprocation of said single headed pistons in said cylinder bores; and a control valve means for adjusting a fluid pressure in said crank chamber to thereby control the capacity of said compressor, said hinge means being provided with a pair of hinges separately coupled to said swash plate assembly to provide two fulcrum positions about which said swash plate assembly is pivotally hinged, said two fulcrum positions being spaced apart from one another with respect to a center position which lies in a plane including the axis of said drive shaft and passing through a predetermined position of said swash plate assembly at which said swash plate assembly is engaged with one of said plurality of pistons brought to a top dead center thereof.

2. A variable capacity single headed piston swash plate type compressor according to claim 1, wherein said two fulcrum positions of said pair of hinges of said hinge means are symmetrically arranged on opposite sides of said plane, one of said two fulcrum positions absorbing a reaction force of the compression of said refrigerant gas acting from said pistons on said swash plate assembly while the other of said two fulcrum positions absorbs a reaction force of the suction of said refrigerant gas acting from said pistons on said swash plate assembly[,] .

3. A variable capacity single headed piston swash plate type compressor according to claim 1, wherein said pair of hinges of said hinge means comprises:

a pair of support arms extended toward said swash plate assembly from said rotary support element;

a pair of guide pins arranged in parallel with each other, and slidably pivoted on said pair of support arms, said pair of guide pins being arranged to be symmetrical with respect to said plane.

4. A variable capacity single headed piston swash plate type compressor according to claim 3, wherein said pair of guide pins of said pair of hinges of said hinge means are pivotally supported on said pair of support arms via turnable ball elements received in spherical race elements, said pair of guide pins passing through said turnable ball elements.

5. A variable capacity single headed piston swash plate type compressor according to claim 1, wherein said pair of hinges of said hinge means comprises:

a pair of support arms extended toward said swash plate assembly from said rotary support element;

a pair of guide pins arranged to be coaxial with each other, and slidably fitted in said pair of support arms, said pair of guide pins being arranged to be symmetrical with respect to said plane.

6. A variable capacity single headed piston swash plate type compressor according to claim 5, wherein said pair of guide pins of said pair of hinges of said hinge means are pivotally and slidably fitted in a pair of elongated through-bores formed in said pair of support arms.

7. A variable capacity single headed piston swash plate type compressor according to claim 1, wherein said *variable inclination rotary swash plate assembly is slidable on said drive shaft via a* slidable sleeve element [has] *having* a spherical outer face thereof on which said swash plate assembly is turnably and slidably mounted.

* * * * *

UNITED STATES PATENT AND TRADEMARK OFFICE

CERTIFICATE OF CORRECTION

PATENT NO. : RE. 35,878

DATED : August 25, 1998

INVENTOR(S) : Kimura et al.

It is certified that error appears in the above-identified patent and that said Letters Patent is hereby corrected as shown below:

Col. 2, line 46, change " sifted" to - -shifted- -.

Col. 3, line 44, change " meals" to - -means- -.

Col. 5, line 22, change " bole" to - -hole- -;

line 39, after " and" insert - -a- -;

line 61, change " shapef" to - -shaped- -;

line 62, change " races" to - -faces- -.

Col. 7, line 30, change " create" to - -cooperate- -;

UNITED STATES PATENT AND TRADEMARK OFFICE

CERTIFICATE OF CORRECTION

PATENT NO. : RE. 35,878

DATED : August 25, 1998

INVENTOR(S) : Kimura et al.

It is certified that error appears in the above-identified patent and that said Letters Patent is hereby corrected as shown below:

Col. 7, lines 52 and 53, change " clement" to - -element- -.

Col. 9, line 50, change " 31" to - -37- -.

Signed and Sealed this

Twenty-seventh Day of April, 1999

*Attest:*

Q. TODD DICKINSON

*Attesting Officer*

*Acting Commissioner of Patents and Trademarks*

UNITED STATES PATENT AND TRADEMARK OFFICE

CERTIFICATE OF CORRECTION

PATENT NO. : Re. 35,878

DATED : August 25, 1998

INVENTOR(S) : Kazuya Kimura, et al

It is certified that error appears in the above-indentified patent and that said Letters Patent is hereby corrected as shown below:

On the title page, item [30] should read:

--Mar. 30, 1991 [JP] Japan.....3-067365--

Signed and Sealed this

Twenty-sixth Day of October, 1999

*Attest:*

Q. TODD DICKINSON

*Attesting Officer*

*Acting Commissioner of Patents and Trademarks*